United States Patent [19]

Menar

[11] Patent Number: 4,923,482

[45] Date of Patent: May 8, 1990

[54] PROCESS FOR SEPARATING SULFUR FROM ORE

[75] Inventor: Arnold B. Menar, San Francisco, Calif.

[73] Assignee: Sulexport-Intertrade A.G., Burlingame, Calif.

[21] Appl. No.: 183,768

[22] Filed: Apr. 20, 1988

Related U.S. Application Data

[63] Continuation-in-part of Ser. No. 852,194, Apr. 15, 1986, abandoned.

[51] Int. Cl.$^5$ .......................................... C01B 17/027
[52] U.S. Cl. ................................ 23/308 S; 423/578 A
[58] Field of Search ....................... 423/578 R, 578 A; 23/293 S, 308 S

[56] References Cited

U.S. PATENT DOCUMENTS

| | | | |
|---|---|---|---|
| 1,548,109 | 8/1925 | Thornton | 23/308 S |
| 1,689,545 | 10/1928 | Baum | 23/308 S |
| 2,537,842 | 1/1951 | McGauley et al. | 23/308 S |
| 2,731,332 | 1/1956 | Ackert et al. | 423/578 A |
| 2,838,391 | 6/1958 | Kaufman et al. | 423/578 R |
| 3,042,502 | 7/1962 | McGauley | 23/308 S |

FOREIGN PATENT DOCUMENTS

| | | | |
|---|---|---|---|
| 5331 | 4/1964 | Japan | 423/578 |
| 860674 | 2/1961 | United Kingdom | 423/578 |

OTHER PUBLICATIONS

Chemical Engineers' Handbook, 5th Ed., Perry et al, eds. McGraw-Hill Book Co., 1973, pp. 19-56, 57, 66, 85, 86.

The Encyclopedia of Chemistry, 3rd ed., Hampel & Hawley, eds. Van Nostrand Reinhold Co., 1973, pp. 166–167.

Primary Examiner—John Doll
Assistant Examiner—Jeffrey Edwin Russel
Attorney, Agent, or Firm—Limbach, Limbach & Sutton

[57] ABSTRACT

An improved process for separating sulfur from low grade surface ore is disclosed. The process involves mixing small particles of sulfur ore with a dilute aqueous solution of an agent to form a slurry. The agent used should be capable of combining with the gangue constituent of the sulfur ore particles such that the overall density of the combination of agent and gangue is substantially less than the density of the aqueous solution. The slurry is heated to a temperature under pressure so as to liquefy the sulfur and yet maintain substantially all of the water in liquid form. The slurry is agitated while heated, forming a dispersion of small sulfur droplets in the aqueous medium. The presence of the dilute agent allows the mixture to settle by gravity to form a molten sulfur phase and an aqueous gangue phase. The sulfur product is recovered as a single continuous phase of molten sulfur. Suitable agents include the disodium salt of ethylene diamine-tetraacetic acid, alkyl-benzene-sulfonate, sodium bicarbonate, magnesium sulfate, sodium chloride, the salts found in sea water and polyphosphates.

34 Claims, 1 Drawing Sheet

PROCESS FOR SEPARATING SULFUR FROM ORE

This is a continuation-in-part of my earlier filed U.S. Pat. Application Ser. No. 06/852,194, entitled "Improved Process For Separating Sulfur From Ore", filed Apr. 15, 1986, now abandoned. Technical Field The present invention relates to an improved process for separating sulfur from ore wherein the sulfur is separated from gangue while in the molten state.

BACKGROUND OF THE INVENTION

Sulfur deposits occur in nature in two forms: (1) large, deep continuous beds of nearly pure sulfur, often in the form of inverted cones; and (2) surface deposits consisting of solid mixtures of elemental sulfur and gangue.

Sulfur found in large deep beds has traditionally been mined by a method known as the "Frasch process" which involves forcing superheated water down drill holes into the sulfur bed to melt the sulfur and pumping molten sulfur to the surface by compressed air. The sulfur deposit must have a capping, usually of rock, strong enough to hold the superheated water down into the bed under high pressure. Although the sulfur thus produced is very pure, the recovery of the total sulfur by this method is usually in the neighborhood of 30 to 40 percent. The inefficiencies of the Frasch method were overlooked in the past because of the then abundance of suitable sulfur deposits. These sources of sulfur have, however, dwindled to a point where today we must look to alternate sources of sulfur (e.g., surface deposits) as well as explore new methods to maximize recovery of sulfur from large deep deposits.

Throughout the years, many techniques for separation of sulfur from surface ores have been devised. The usefulness of these techniques depend largely upon the form and amount of sulfur present in the ore, as well as the efficiencies of the technique and purity of the resultant sulfur. One method, known as the "Sicilian process", produces very pure sulfur and involves actually burning the ore. The heat melts the sulfur which is collected in molten form. The combustion is fueled by the sulfur itself, thus a quantity of the sulfur contained in the ore is consumed as fuel. Sulfur recovery is further limited by the tendency of molten sulfur to adhere to gangue. In practice, application of the Sicilian method has been limited to those types of ores containing substantial veins of pure sulfur. Adherence of molten sulfur to gangue renders the process unsuitable for ore having small sulfur deposits disseminated throughout, the form in which the majority of sulfur is found.

Other methods used on surface ores include the vaporization, solvent extraction methods, flotation, autoclaving, agglomeration and various combinations of the same. The vaporation process involves heating a slurry of ground ore to vaporize the sulfur contained therein. The sulfur and water constituents of the slurry are separated from the solid gangue constituents as vapor. However, the process is quite expensive to carry out due to the amount of energy required to vaporize sulfur.

The solvent extraction process involves removing sulfur from surface ores with the use of solvents in which sulfur is partially soluble. Solvents which have been used include carbon disulfide, kerosene and chlorinated hydrocarbons such as trichlorethylene and perchlorethylene. Ammonia has also been suggested as a suitable solvent for the process.

In the flotation method, ore is finely ground and mixed with water. Sulfur particles are separated from gangue particles based upon solid sulfur's ability to float in solution while gangue sinks to the bottom. Modifications of this method include adding a reagent to increase sulfur's floatability in water. Reagents which have been used include creosote, pine oil, kerosene, alcohols and methyl isobutyl carbinol. This process, however, produces sulfur of very low purity, especially where the sulfur in the starting material ore is extremely disseminated therein.

The autoclaving method is somewhat like an artificial Frasch process in that it involves the use of superheated water to melt sulfur off of gangue. Fines of ore are placed upon a grate and superheated water and live steam are added to melt sulfur off of gangue. The molten sulfur falls through the grate and is collected below. Modifications of this method include using saturated aqueous solutions of calcium chloride or zinc chloride as the autoclaving medium. These solutions have densities above that of molten sulfur and boiling points above that of sulfur. The sulfur coalesces in a pool above the medium while the gangue is attracted to the medium by gravity and surface tension.

One such method of sulfur extraction is that of U. S. Pat. No. 2,731,332 to G. F. Ackert et al. which discloses a method to extract sulfur from ore in the molten state. In that method, a slurry comprising only sulfur ore and water is heated to 280 to 300 degrees Fahrenheit under pressure to cause the sulfur constituent of the ore to melt. The water component of this slurry functions only to form the slurry and as a heat transfer medium to allow the sulfur constituent to melt. The heated slurry, which consists at this stage of water, gangue and molten sulfur, is then passed through a filter comprised of a metallic screen and a layer of wet gravel. The filtrate of this first separation consisting of sulfur, water and sludge is collected below the screen and led to a settling tank. The filtrate then undergoes a second separation whereby it is allowed to settle into two phases: (1) a water phase; and (2) a molten sulfur and sludge phase. The sludge particles of the second phase, due to their densities, collect at the bottom of the sulfur reservoir and are later drawn off. The water component of the filtrate is recycled into the process after it has been purified by a flocculation process to remove any suspended solids contained therein by colloidal action. In the water purification step, certain unspecified "chemicals" are introduced into the water filtrate to control pH and/or flocculation of the suspended solids.

The acid agglomeration process has been used to purify sulfur, especially that found in flotation concentrates. The process essentially involves agglomerating gangue particles with strong (98%) sulfuric acid. The flotation concentrate is first ground and melted at atmospheric pressure. Sulfuric acid is then added and the mixture is slowly agitated to cause the molten sulfur to coalesce on the bottom and the gangue particles to agglomerate on the top. This process, however, was considered unattractive because of the dangers involved in handling large amounts of hot sulfuric acid.

The observation that molten sulfur droplets tend to coalesce in both the autoclaving and acid agglomeration methods was useful in leading to the development of a process in which sulfur is melted away from gangue in an aqueous slurry heated under pressure while agitated. Forbath, T.P., "Sulfur Recovery From Low-Grade Sulfur Deposits," Transactions AIME (September 1953), pp. 881-885. After the heating period, cold water is injected into the agitated mixture and the temperature is reduced to freeze all the liquid sulfur particles. The solid sulfur is then further processed according to the flotation method. It was found that the thermal treatment step obviated the need to finely grind the ore as required by straight flotation alone which resulted in significant conservation of energy used to grind the ore and hence reduced costs of operation.

Despite the many and varied processes for separation and purification of sulfur that are known, there is still a need for a more effective process for separating sulfur from low grade surface ore. The present invention addresses this need.

It is thus an object of the present invention to provide an improved process of separating substantially gangue-free sulfur from low grade ore.

It is another object of the present invention to provide a reagent to facilitate coalescence of molten sulfur droplets in an aqueous medium.

It is yet another object of the present invention to provide a reagent which allows molten sulfur to be separated as a single continuous layer from an aqueous slurry.

SUMMARY OF THE INVENTION

The present invention provides an improved process for recovering sulfur from sulfur ore containing elemental sulfur and gangue. The process utilizes the tendency of molten sulfur droplets dispersed in a liquid medium in which it is relatively insoluble to coalesce, forming larger molten sulfur droplets.

It has been discovered that the speed and degree of coalescence of small molten sulfur droplets is enhanced if the droplets are dispersed in a dilute aqueous solution of an agent capable of combining with the gangue constituent of the starting ore particles such that the overall density of the combination of the agent and gangue is substantially less than the density of the aqueous solution. It has been further discovered that the employment of dilute aqueous concentrations of such agents facilitates separation of gangue from molten sulfur and enables coalescence sulfur droplets to continue until the molten sulfur settles into a single continuous phase which may be separated from the aqueous phase containing most of the gangue. Successfully used agents include the salts contained in ordinary sea water, the disodium salt of ethylene diamine-tetra acetic acid, alkyl-benzene-sulfonate, sodium bicarbonate, magnesium sulfate, sodium chloride and polyphosphates.

Pursuant to the present invention, small particles of sulfur ore are mixed with a dilute aqueous solution of an agent capable of combining with the gangue constituent of the ore particles such that the overall density of the combination of the agent and gangue is substantially less than the density of the aqueous solution to form a slurry. The slurry is heated to a temperature at least equal to the melting point of sulfur, preferably in the range of 250-350° F., under a pressure sufficient to maintain substantially all of the water in liquid form. After heating, a dispersion of molten sulfur droplets is formed in the aqueous medium. The heated, pressurized slurry is further agitated promoting coalescence of the molten sulfur droplets. The mixture is then settled to form a lower liquid sulfur phase containing minor amounts of residual gangue and an upper aqueous phase containing gangue and a small amount of elemental sulfur. The two phases are then separated.

Depending upon the characteristic of the starting material ore, the separated molten sulfur may be of a purity such that no further treatment is needed. It may, if necessary, be further purified by washing with a further quantity of dilute aqueous solution of the agent and settling the mixture to form a purified liquid sulfur phase and an aqueous phase containing residual gangue. The phases are then separated and the purified molten sulfur is withdrawn as product. The small molten sulfur residue in the gangue may be extracted by washing the gangue with a further quantity of heated dilute aqueous agent solution. The molten sulfur then settles into a substantially gangue-free sulfur phase which is also withdrawn as product.

After the gangue washing step, the aqueous phase may be still further processed by mixing it with additional dilute aqueous solution of the agent and heating the resulting mixture to a temperature in the range of approximately 250°-350° F. under a pressure sufficient to maintain substantially all of the water in liquid form and to liquefy the elemental sulfur, forming a thin dispersion of small molten sulfur droplets. The mixture is then cooled to a temperature below the melting point of sulfur to form solid sulfur particles which are larger than the gangue particles. The sulfur particles are then separated from the gangue particles by passing the solid components of the cooled mixture through a screen of appropriate size to allow the smaller gangue particles to pass without allowing passage of the larger solid sulfur particles.

BEST MODE FOR CARRYING OUT THE INVENTION

Figure 1:
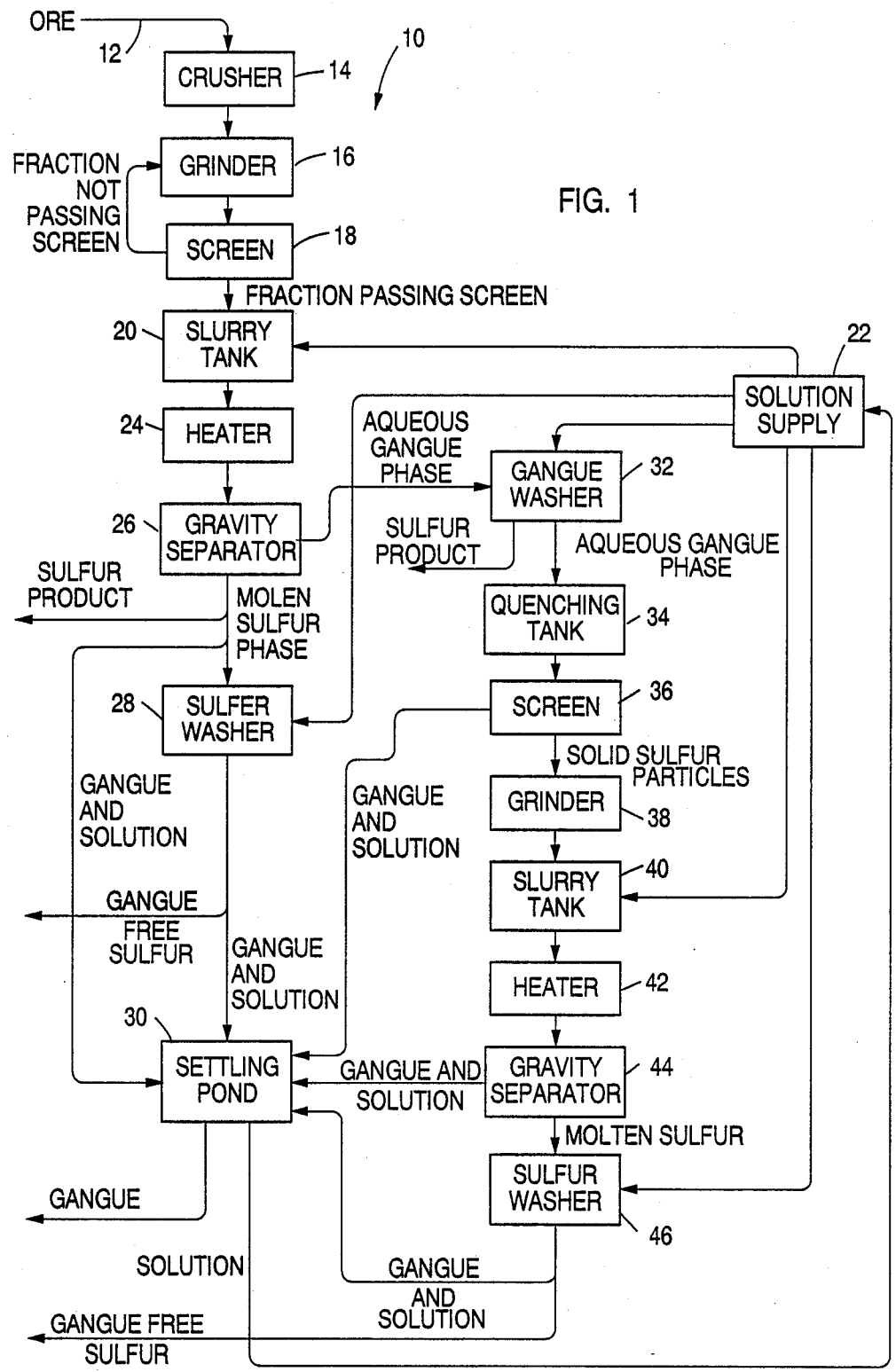
FIG. 1 is a schematic diagram of an embodiment of the process of the present invention.

As can be appreciated from the accompanying drawing, the process of the present invention may be used in either a batch of continuous-type process. Where the process is used to separate or purify sulfur on a large scale, the continuous embodiment may prove more useful that the batch-type embodiment.

Referring now to FIG. 1, an embodiment of the present invention is shown generally as 10. The first step in the process is to pass sulfur ore 12 through crusher 14 and grinder 16 where the large ore chunks are crushed and ground to produce particles mainly of, or below, a predetermined particle size. After passing through grinder 16, the ore particles are screened through screen 18 having openings approximately equal to the maximum predetermined size. The particles which pass through screen 18 are passed to slurry tank 20. The particles which remain on the surface cf the screen are recycled to grinder 16 to be reground. It has been found that the optimum size of the particle's depends upon the sulfur content of the ore to be processed. Higher sulfur contents permit use of larger particles, and vice versa. For example, where the sulfur content is greater then 65%, 30 U.S. Standard mesh (approximately 0.595 mm) particle size has been found satisfactory. Where, the sulfur content is appreciably less than 65%, 60 U.S. Standard mesh (approximately 0.250 mm) particle size permits higher sulfur recovery.

After placement of the ground ore in slurry tank 20, a dilute aqueous solution of an agent from solution supply 22 is added to the ore particles to form an aqueous slurry. The agent is one which, in an aqueous environment such as the aqueous slurry, is capable of combining with the gangue constituent of the ore particles such that the overall density of the combination of the gangue and agent is less than the density of the aqueous environment. Hereinafter, the term "agent" is meant to refer to an agent having the above-described ability to combine with gangue particles in an aqueous environment.

The slurry should have an ore particle content in the range of about 20–60%, preferably 50%, by weight. The slurry is passed to heater 24 where it is agitated and heated under pressure to a temperature at least equal to the melting point, but below the boiling point, of sulfur. Temperatures of 250°–350° F. and pressures of 30–140 psi have proven effective with 290° F. and 80 psi preferred. The sulfur content of the heated, pressurized slurry melts to form molten sulfur droplets which coalesce when the slurry is mildly agitated to form larger drops and finally to form a continuous liquid sulfur phase.

The usual main constituents of gangue (calcium sulfate, silica, alumina, titanium oxide and iron oxide) have individual densities greater than that of molten sulfur. However, when the contained sulfur is melted out of the finely divided ore particles, the gangue particles combine with the agent in the aqueous environment of the slurry such that the overall density of the combination of agent and gangue is substantially less than the density of the aqueous solution. Thus, the gangue remains in the aqueous phase which floats above the molten sulfur phase. The agent used in the process of the present invention do not act to merely control pH or as mere buffers. Rather, they function by actually altering the effective density of the gangue constituent of the ore in an aqueous environment and allows the otherwise heavy gangue particles to actually float above the lower molten sulfur phase.

Agents which have exhibited this effect on heated ground ore particles include the disodium salt of ethylene diamine-tetra acetic acid, alkyl-benzenesulfonate, sodium bicarbonate, magnesium sulfate, sodium chloride and polyphosphates. They should be present in the slurry in dilute concentrations in the range of 1:400 to 1:20 agent to sulfur ore particles by weight. For example, where the slurry is 50% solids by weight, the concentration of agent in solution should be in the range of approximately 0.25 to 5.00 percent by weight. Alternatively, ordinary sea water may be used as the aqueous solution.

The slurry is passed from heater 24 to gravity separator 26 where it settles forming a bottom molten sulfur phase containing minor amounts of residual gangue and a top aqueous phase containing gangue and a small amount of elemental sulfur. The phases are then separated. Depending upon the sulfur content of the ore starting material, the molten sulfur thus separated may be of sufficient purity such that no further processing is desired. However, if an even purer sulfur product is desired, i.e., if the amount of gangue in the molten sulfur phase is undesirable, it may be further purified by passing it through sulfur washer 28 where it is washed with a further quantity of dilute aqueous solution of an agent under temperature and pressure conditions similar to those in gravity separator 26. The mixture is then allowed to settle into a bottom molten sulfur phase and a top aqueous phase containing gangue carried over from the gravity separator 26 effluent. The phases are then separated. The resulting sulfur is of a high commercial quality and ready for use.

The aqueous gangue layer formed in gravity separator 26 may be disposed of, placed into settling pond 30 where the aqueous solution may be recovered, or may be further subjected to extraction. Residual molten sulfur remaining in the separated aqueous gangue phase leaving gravity separator 26 may be extracted by washing the gangue in gangue washer 32 where further heated aqueous solution from solution supply 22 is added to the mixture. There, the entire mixture is agitated under pressure within the same temperature and pressure ranges as the first separation. The molten sulfur is allowed to settle into a substantially gangue-free molten sulfur phase and is, if of a sufficient purity, withdrawn as product. The remaining gangue and residual sulfur mixture is then passed to quenching tank 34 where it is cooled to a temperature below the melting point of sulfur, preferably in the range of 160°–190° F. At such temperatures, the coalesced molten sulfur droplets solidify into solid agglomerates which are larger in size than the gangue particles. Where the original ore is ground to pass through a 60 U.S. Standard mesh screen, the solid sulfur agglomerates should be larger than 45 U.S. Standard mesh (approximately 0.354 mm). The solid sulfur may be separated from the smaller gangue particles by passing the entire mixture through a vibrating screen 36 having openings of a size sufficient to permit most of the smaller gangue particles to pass through but not allowing the layer sulfur particles to pass. The gangue and aqueous solution may be disposed of or pumped into settling pond 30 where the aqueous solution may be recovered. The resulting solid sulfur is at least 90% pure and may be further purified by grinding into smaller particles in grinder 38. The ground sulfur is passed to slurry tank 40 where a further quantity of dilute aqueous solution of agent is added to the ground sulfur. The mixture is heated in heater 42 to a temperature in the range of 250°–350° F., preferably 290° F., under a pressure between 30–140 psi, preferably about 80 psi, and agitated. The sulfur then melts once again into droplets. Upon liquefication, minor gangue impurities present in the sulfur are released into the aqueous phase. The molten sulfur droplets coalesce. The mixture is passed to gravity separator 44 and is there allowed to settle into a bottom molten sulfur phase and a top aqueous phase containing minor amounts of gangue. The phases are then separated. The separated aqueous gangue phase may be disposed of or may be passed to settling pond 30 where the aqueous solution may be recovered. The molten sulfur may be further purified of trace amounts of gangue by passing it to sulfur washer 46 where it is washed with a further quantity of dilute aqueous solution of an agent as in the previous washing steps. The sulfur thus produced is of a high grade and ready for prilling or it may be placed in a holding tank (not shown) at about 290° F. at atmospheric pressure.

Where the species of agent used in the aqueous solution represents a significant expenditure, a user will likely wish to conserve funds and recycle the aqueous solution. In such a case, the separated gangue and aqueous solution phases from the separations and washing steps above-described are pumped into settling pond 30 where the gangue constituent is allowed to settle out by gravity. The aqueous solution, now free of gangue, may be recovered and pumped into solution supply 22 for future use. The gangue material remaining in settling pond 30 may be disposed of or used for landfill.

The effectiveness of the above-described invention may be further appreciated from the following examples.

EXPERIMENTAL

Example 1

A pilot plant was constructed in accordance with the above-disclosed invention. The process was operated continuously and ore was continually introduced into the process and sulfur product and gangue waste were continually withdrawn from the process.

The starting material was Bolivian sulfur ore having a 78.7% sulfur content. The ore was first crushed into pieces having diameters of no more than one inch. The crushed ore was ground to 60 mesh or smaller in a ball mill. The ground ore was passed through a vibrating screen to separate the −60 fraction from the +60 fraction. The +60 fraction was returned to the ball mill for additional grinding and screening. A total of 23.00 kg of −60 ore was passed to a tank where the aqueous solution containing the agent was introduced to the ground ore to form a slurry. The agent used was sodium bicarbonate.

To form the slurry, 20.00 kg of tap water was added to the ground ore followed by 3.23 kg of a solution comprised of 3.00 kg water and 0.23 kg of sodium bicarbonate. The resulting slurry was 49.75% ore by weight. The amount of sodium bicarbonate used was 1.00% by weight of the total amount ore in the slurry.

The slurry was agitated and heated by pumping it through a glycol heat exchanger to a temperature of 290° F. under a pressure of 80 psi. The heated mixture was allowed to settle in a gravity separator. The molten sulfur product was withdrawn and the processed gangue was removed from the process continuously throughout the operation. The operation was stopped when 32.40 kg of the slurry was processed. A significant amount of intermediately processed slurry remained in the gravity separator upon interruption of the process.

The 32.40 kg of processed slurry represented 16.12 kg of processed dry ore. Of the ore processed, 5.69 kg was withdrawn as sulfur product and 1.03 kg was removed from the process as depleted gangue. The residue in the gravity separator consisted of a 6.24 kg sulfur layer and a 2.65 kg gangue layer. The sulfur content of each of these fractions was determined. The results of these determinations are shown in Table I below:

TABLE I

| fraction | yield (kg) | % sulfur (wt) | sulfur content (kg) |
|---|---|---|---|
| sulfur/withdrawn as product | 5.69 | 99.6 | 5.67 |
| sulfur layer in gravity separator | 6.24 | 86.6 | 5.40 |
| gangue layer in gravity separator | 2.65 | 52.4 | 1.39 |
| depleted gangue | 1.03 | 16.5 | 0.17 |

The starting material ore in this case, having a mere 78.7% sulfur content, was processed to yield a significant quantity of high grade sulfur which is ready for use in industry. As can be appreciated from these results, the process of the present invention is an effective process to transform otherwise useless low grade surface ore into a produce ready for consumption.

EXAMPLE 2

This example illustrates the effectiveness of the present invention on the sulfur product purity and yield. A run applying the essential teachings of the present invention, i.e., extraction of molten sulfur from a heated aqueous slurry in the presence of a dilute concentration of an agent, was compared with a run using the identical protocol using only water as the aqueous medium for the slurry.

In this example, two runs were preformed. One run using an aqueous solution of an agent (hereinafter "Agent Run") in accordance with the present invention and the other run using water only to form the aqueous slurry. The protocols, materials and equipment used for both the runs were identical. The two runs were identically performed with the exception that the Agent Run utilized an agent while the Water Run did not. The protocol followed for both runs was as follows:

a. Dry sulfur ore particles having a size smaller than 60 mesh were mixed with fluid to make a slurry.

b. The slurry of step (a) was heated to 250 degrees Fahrenheit and maintained at this temperature for twenty minutes to allow the sulfur constituent of the ore particles to melt into sulfur droplets and agglomerate.

c. The heated slurry of step (b) was then cooled to ambient temperature (75 degrees Fahrenheit) and the molten sulfur droplets were solidified.

d. The cooled mixture of step (c) containing particulate matter in the form of sulfur particles and gangue particles was passed through a 60 mesh sieve. The fraction retained on the screen was retrieved as "product", while the fraction passing through the screen was separated as "gangue".

e. The product fraction of step (d) was washed with the fluid portion of the slurry which was collected with the gangue.

f. The solid constituents of both fractions were dried and sulfur determinations on each fraction was performed using the "Ashing" method described hereinbelow.

The slurries of both runs were comprised as shown in Table II below:

TABLE II

| Constituent | Water Run | Agent Run |
|---|---|---|
| dry ore | 47.212 grams | 47.247 grams |
| water | 250 grams | 250 grams |
| agent | none | 0.500 grams |

The agent used in the Agent Run was technical grade alkyl benzyl sulfonate ("ABS") which was comprised of 70% ABS and 30% sodium sulfate by weight. The water constituent of the slurries of both runs was ordinary tap water obtained from the local public water supply of Oakland, Calif.

After the ore samples were subjected to the protocol described above, the amount of sulfur present in each of the dried fractions for each run was determined by a process commonly used to determine sulfur content known as "ashing". Those results were compared with the known amount of sulfur present in the starting material ore samples which was also determined by the ashing method.

The protocol used for the ashing method is as follows:

a. A sample containing sulfur is dried at 110 degrees Centigrade until the weight of the sample is constant so as to remove any water which may be present therein and weighed.

b. The dried sample of step a is heated to the ignition of sulfur in order to remove the sulfur constituent of the sample. The temperature is so maintained until combustion of all of the sulfur in the sample is complete c. The resulting residue of step b is heated to 1000 degrees Centigrade for thirty minutes and then cooled and weighed.

The difference in the weight of the dried sample prior to combustion and the cooled residue after combustion is the weight of the sulfur constituent of the original dried sample. The accuracy of this process has been confirmed by comparison to the results from a Leco Sulfur Analyzer (Leco Corporation, 3000 Lakeview Avenue, St. Joseph, Mich.) and perchloroethylene extraction of sulfur from ore.

The results of the ashing procedures on the starting material ore samples and the product and gangue fractions of both the Agent Run and the Water Run are shown in Table III below:

TABLE III

| Sample | Sulfur Content (grams) | Sulfur Content (percent) | Sulfur Yield (percent) |
|---|---|---|---|
| Water Run/ starting ore | 28.268 | 59.875 | — |
| Water Run/ product fraction | 22.548 | 94.902 | 79.765 |
| Water Run/ gangue fraction | 5.599 | 24.067 | 19.807 |
| Agent Run/ starting ore | 28.291 | 59.880 | — |
| Agent Run/ product fraction | 25.928 | 94.600 | 91.647 |
| Agent Run/ gangue fraction | 2.251 | 11.430 | 7.957 |

As shown in this example, the addition of an agent of the present invention dramatically increases the ability of the process to extract sulfur from ore. The presence of the agent (in this example, technical grade alkyl benzyl sulfonate) increased the sulfur yield from ore from 79.765 percent to 91.647 percent while the product purity remains substantially the same (94.902 and 94.600 percent sulfur respectively). Thus, the addition of an agent to the aqueous slurry decreases the tendency of gangue particles to remain in the molten sulfur phase. In the comparative runs, the sulfur content of the gangue fraction was reduced from 19.807 percent to 7.957 percent, nearly a 250 percent decrease. Thus, the results of this comparative example demonstrate that the use of an agent to effect separation of sulfur from ore yields unexpected and surprising results.

The above-described procedure is a "batch-type" procedure and was used to allow a facile illustration of the beneficial effects of the agent. However, use of the process of the present invention in a continuous flow system as disclosed herein will increase the efficiency and effectiveness of the present invention in extracting sulfur than the batch-type process.

Although the foregoing invention has been described in some detail by way of illustration and example for purposes of clarity of understanding, it will be obvious that certain changes and modifications may be practiced within the scope of the appended claims.

I claim:

1. A process for separating sulfur from particles of sulfur ore containing elemental sulfur and gangue, wherein said particles are not substantially larger than 30 U.S. Standard mesh, said process comprising the steps of:

(1) mixing said particles with a dilute aqueous solution having as density and containing water and an agent capable of combining with the gangue constituent of said particles such that the overall density of the combination of said agent and gangue is substantially less than the density of said aqueous solution to form a slurry;

(2) heating said slurry to a temperature in the range of approximately 250°–350° F. under a pressure sufficient to maintain substantially all of the water in liquid phase and to form a dispersion of molten sulfur droplets in the aqueous solution;

(3) agitating the heated slurry to cause coalescence of the molten sulfur droplets;

(4) settling said heated slurry into an upper aqueous phase containing said aqueous solution and a substantial majority of the gangue originally present in said particles of step (1) and a continuous lower phase containing molten sulfur and a residual amount of gangue; and (5) separating said lower phase from said upper phase.

2. The process according to claim 1 wherein said particles of step 1 are in the range of about 30 to 60 U.S. Standard mesh.

3. The process according to claim 1 wherein said particles of step 1 are not substantially larger than 60 U.S. Standard mesh.

4. The process according to claim 1 wherein the slurry is comprised of approximately 20 to 60 percent ore particles by weight.

5. The process according to claim 1 wherein said aqueous solution of an agent is sea water.

6. The process according to claim 1 wherein said agent is present in the slurry in a ratio in the range of 1:400 to 1:20 agent to sulfur ore particles by weight.

7. The process according to claim 1 wherein said agent is selected form a group consisting of the disodium salt of ethylene diamine-tetraacetic acid, alkyl-benzene-sulfonate, sodium bicarbonate, magnesium sulfate, sodium chloride and polyphosphates.

8. The process according to claim 1 wherein said agent is the disodium salt of ethylene diaminetetraacetic acid.

9. The process according to claim 1 wherein said agent is alkyl-benzene-sulfonate.

10. The process according to claim 1 wherein said agent is sodium bicarbonate.

11. The process according to claim 1 wherein said agent is magnesium sulfate.

12. The process according to claim 1 wherein said agent is sodium chloride.

13. The process according to claim 1 wherein said agent is a polyphosphate.

14. The process according to claim 1 wherein said pressure is in the range of about 30 psi and 140 psi.

15. The process according to claim 1 wherein said temperature is approximately 290° F. and said pressure is approximately 80 psi.

16. The process according to claim 1 wherein, after step 5, the molten sulfur phase is washed with additional dilute aqueous solution of an agent.

17. The process according to claim 1 wherein at least a portion of the aqueous phase from step 4 is recycled to step 1 and wherein at least a portion of the molten sulfur stage is withdrawn as product.

18. The process according to claim 1 wherein said aqueous phase includes residual molten sulfur, and wherein, after step 5, the residual molten sulfur is washed off of the gangue with a further quantity of dilute solution of an agent heated to a temperature at least equal to the melting point of sulfur.

19. A process for separating sulfur from particles of sulfur ore containing elemental sulfur and gangue wherein said particles are not substantially larger than 30 U.S. Standard mesh, said process comprising the steps of
   (1) mixing said particles with a dilute aqueous solution having a density and containing water and an agent capable of combining with the gangue constituent of said particles such that the overall density of the combination of said agent and the gangue is substantially less than the density of said aqueous solution to form a first slurry;
   (2) heating said first slurry to a temperature in the range of approximately 250°–350° F. under a pressure sufficient to maintain substantially all of the water in liquid phase to form a dispersion of molten sulfur droplets in the aqueous medium;
   (3) agitating the heated first slurry to cause coalescence of the sulfur droplets, and then settling the slurry to form a lower liquid sulfur phase containing minor amounts of residual gangue and an upper aqueous phase containing gangue and a residual amount of elemental sulfur and then separating the phases;
   (4) mixing the aqueous phase formed in step 3 with additional dilute aqueous solution of an agent to form a second slurry and heating the mixture to a temperature in the range about 250°–350° F. under a pressure sufficient to maintain substantially all of the water in liquid phase to liquefy contained elemental sulfur forming molten sulfur droplets;
   (5) cooling the hot mixture to a temperature below the melting point of sulfur forming solid sulfur particles of greater size than the gangue particles; and
   (6) separating the larger sulfur particles from the smaller gangue particles and aqueous solution.

20. The process according to claim 19 wherein the aqueous phase formed in step 3 includes residual molten sulfur, and wherein, after step 3, the residual molten sulfur is washed off of the gangue with a further quantity of dilute solution of an agent heated to a temperature at least equal to the melting point of sulfur.

21. The process according to claim 19 further comprising the steps of:
   (7) melting the separated sulfur particles of step 6;
   (8) adding the molten sulfur from step 7 to the second slurry of step 4; and
   (9) removing at least a portion of the larger sulfur particles of step 6 from said process.

22. The process according to claim 19 further including the steps of passing the gangue and aqueous portion of the mixture from step 6 to a settling pond to settle the gangue from the aqueous phase, decanting the aqueous phase and returning at least a portion of it to each of steps 1 and 4.

23. The process according to claim 19 wherein the particles of step 1 are in the range of about 30 to 60 U.S. Standard mesh.

24. The process according to claim 19 wherein the particles of step 1 are approximately 60 U.S. Standard mesh and the sulfur particles of step 6 are at least 45 U.S. Standard mesh.

25. The process according to claim 19 wherein the first slurry or the second slurry are comprised of approximately 20 to 60 percent ore particles by weight.

26. The process according to claim 19 wherein said aqueous solution of an agent is sea water.

27. The process according to claim 19 wherein said agent is present in said first slurry or said second slurry in a ratio in the range of 1:400 to 1:20 agent to sulfur ore particles by weight.

28. The process according to claim 19 wherein said agent is selected from a group consisting of the disodium salt of ethylene diamine-tetraacetic acid, alkyl-benzene-sulfonate, sodium bicarbonate, magnesium sulfate, sodium chloride and polyphosphates.

29. The process according to claim 19 wherein said agent is the disodium salt of ethylene diaminetetraacetic acid.

30. The process according to claim 19 wherein said agent is alkyl-benzene-sulfonate.

31. The process according to claim 19 wherein said agent is sodium bicarbonate.

32. The process according to claim 19 wherein said agent is magnesium sulfate.

33. The process according to claim 19 wherein said agent is sodium chloride.

34. The process according to claim 19 wherein said agent is a polyphosphate.

* * * * *